Patented Oct. 10, 1939

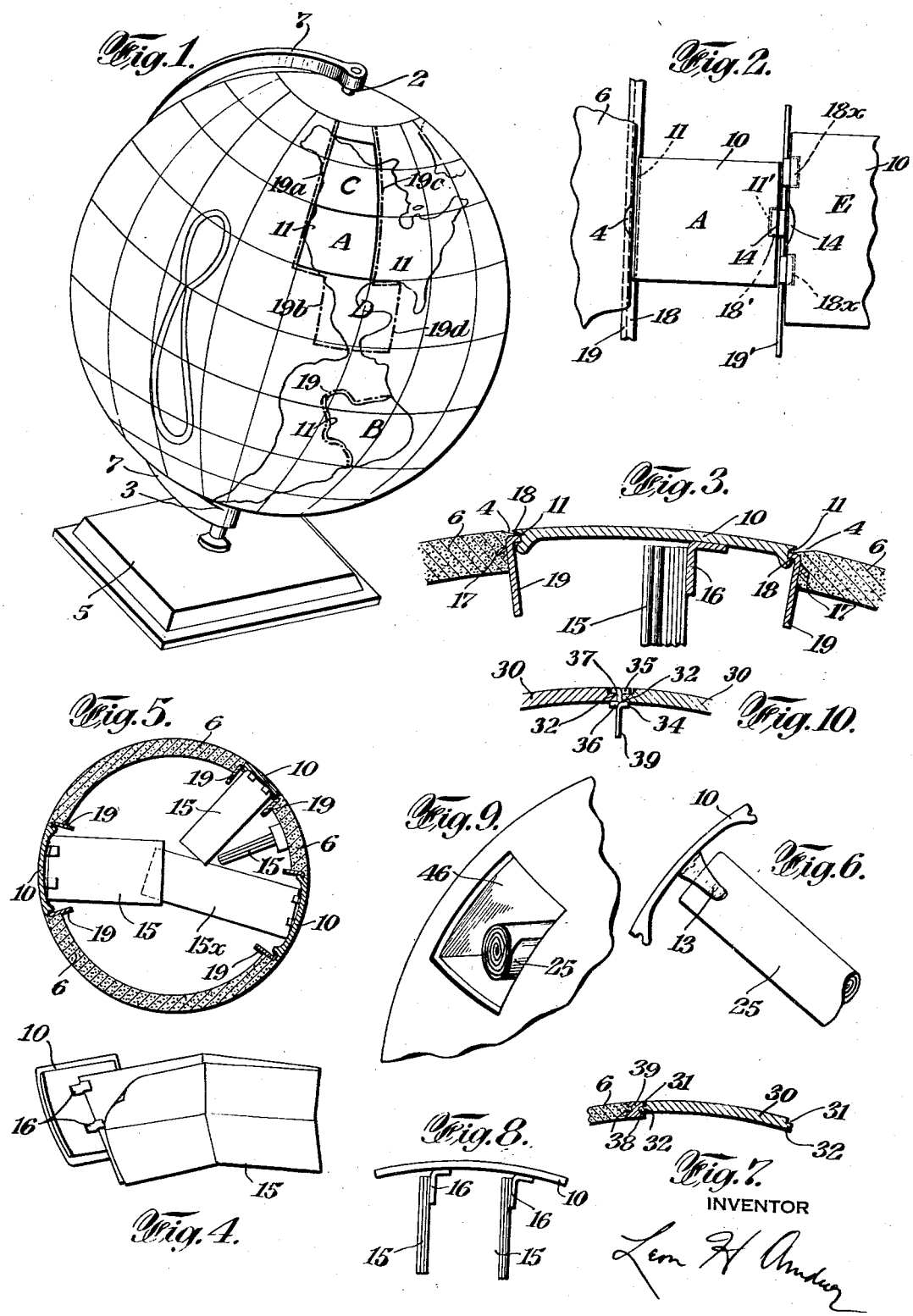

2,175,239

UNITED STATES PATENT OFFICE 2,175,239

WORLD NOVELTY

Leon H. Amdur, Brooklyn, N. Y.

Application December 7, 1938, Serial No. 244,355

26 Claims. (Cl. 35—46)

This invention relates to territorial globes and has for one of its objects to implement a territorial globe with individual maps—preferably on paper or cloth—of different parts of the world and on a very much larger scale and greater detail than shown on the globe itself, the individual paper maps being contained within the globe and associated with the territorial globe map according to geographical location. For example, there may be provided a large scale (i. e., at least larger than the globe map and in greater detail) paper map of the eastern half of the United States; this will be associated with, i. e., located at that part of the globe map which represents the same section of country on the globe map. Preferably the novel globe of this invention would have the external appearance of any ordinary territorial globe and may be consulted in the same manner; if it is desired to examine a portion of country with greater detail, a suitable part of the globe surface is removed to reveal, within the globe, and make accessible, the larger scale paper map of that portion or country which individual map is abstracted from the globe and unfurled or unfolded for consultation.

The objects of the invention are therefore to provide a territorial globe with facilities enabling geographical units thereto to be studied in much greater detail and on a larger scale than possible on the globe map itself; and to provide this facility without the need of consulting atlases or books to supplement the showing of the globe; to coordinate the paper or cloth maps which, as stated, are drawn to a much larger scale and in greater detail, with the spherical location of the particular geographical units to which the supplementary maps relate; thus, the supplementary maps are arranged (or "indexed") according to natural or logical geographical or "spherical" location, rather than according to unnatural or artificial page numbers, as is the case where a map book or atlas is used; to provide facilities for bringing the territorial globe up-to-date and thus to ensure permanency to the globe. The individual maps, as will be more fully described subsequently, are contained within the globe itself, in association with removable globe sections. Revised individual maps and globe sections may be issued from time to time to replace old maps and sections, whenever changes are made in the boundaries of different countries and states, or when changes are made in the names of countries, states, cities, bodies of water, mountains, etc., or when new lands are discovered and named, and so forth. In this way, both the globe map itself, and also the individual maps, may be easily and inexpensively brought up to date, preventing the globe from becoming antedated and obsolete.

For the attainment of these objects and such other objects as may hereinafter appear or be pointed out, I have shown preferred forms of my invention in the accompanying drawing, wherein:

Fig. 1 is a perspective view of a globe embodying this invention;

Fig. 2 is a detail, in plan, of one manner of construction providing for removable globe sections;

Fig. 3 is a sectional elevational view of the same, further showing a folded paper map attached to the underside of the cover section;

Fig. 4, in perspective, shows the manner of unfolding an individual paper map, to which is attached its cover section;

Fig. 5 is a central section through the novel globe;

Fig. 6 shows a rolled map removably associated with the globe section.

Fig. 7 is a detail in section of a construction reversing that of Fig. 3;

Fig. 8 shows a globe section to which is attached two individual maps;

Fig. 9 is a fragmentary, perspective view of a globe provided with a map compartment; and Fig. 10 is a detail in section of the construction illustrated in Fig. 7.

In Fig. 1, a globe 1 is supported in the usual manner for rotation between bearings 2 and 3 provided at the ends of a semi-circular brace 7 which is held by base 5. The spherical surface of the globe is of course covered by a world map with the usual longitude and latitude lines. The globe surface itself, or rather the greatest portion thereof (more particularly, that part of the globe surface which is not constructed in the novel manner hereinafter set forth) may be formed of plaster of Paris, papier-mâché, or any other suitable or usual composition or molded material, or may be constructed in the particular manner hereinafter set forth. In the accompanying drawing this plaster or molded construction is designated by the reference character 6.

Certain portions of the globe are not constructed of plastic or molded composition (6) but are made in a manner enabling such portions to be readily removable. These portions will in general be the land areas of the globe as distinguished from the ocean areas, although it may be desirable in some instances to overlap a removable section so that it comprises both land and ocean or even ocean alone. Nor is it necessary that a removable section for a particular country, continent or part thereof, be exactly commensurate with, and cover, the particular country or part thereof. For example, the removable section which is removed to gain access to the individual paper map of, say, the United States, need not be as large as the map of the United States as it appears on the territorial globe.

The removable globe section may itself take the irregular outline of the particular country or part thereof. For example, the removable cover section which is removed to gain access to the paper map of Brazil, may have the irregular outline of that country, see B, Fig. 1. Or the cover may be made of regular (square, rectangular, etc.) outline, as has been done in Fig. 1 with respect to the western half A of the United States. The sides of the regular cover A are preferably parallel to the longitude and latitude lines of the globe and may even be, as shown in Fig. 1, coincidental therewith. The regular outline of the globe sections is to be preferred where it is desired to provide the facility of bringing the globe up-to-date by issuing revised globe sections (and also individual large scale maps, as will be seen). By providing regular shaped removable globe sections—i. e., which do not follow the irregularities of the boundaries of geographical units represented thereby—changes in boundaries are readily made thereon irrespective of the size and shape of the removable globe section itself and without necessitating a change in either the size and shape of the globe section or of the means provided for holding the section in its proper place on the globe (which means will be more fully described hereinafter).

The removable globe sections, whether of regular shape A or irregular shape B, are preferably made of a substance such as Celluloid and are in the form of sheets slightly curved to the contour of the globe, designated 10, see Fig. 3. Celluloid is preferred because the cover section may be slightly flexed in removing or placing it in position (in a manner presently described); of course any other material which permits this flexing or snapping may be used. Along two parallel edges, or portions, of section 10 there are provided grooves 11, Fig. 3, preferably parallel to the longitudinal lines, see Fig. 1; this is the construction where a regular outline section (as A, Fig. 1) is used; where an irregular contour section (as B, Fig. 1), the entire periphery of the section or a portion or portions thereof may be grooved. In the edge grooves 11 of the cover section 10 is received the turned edge 18 of rib members 19, see Fig. 3.

Rib members 19, constructed of flat strip material, such as brass or tin plate or the like, are provided at the various places of the globe where it is desired to provide an individual paper or cloth map, and serve a number of purposes. First, the rib member provides a means for supporting the molded or plaster globe structure 6, see Fig. 3, or rather for the edge thereof contiguous to removable section 10. Section, the rib member by its turned edge or flange 18 provides a support for the cover sections 10, into the groove edges of which the turned flange is received. Third, the rib member serves as a brace "foundation" for the entire globe structure.

Rib members 19 may run parallel to the longitude lines of the globe and in fact are shown in Fig. 1 as coincident to the longitude lines, at least for a portion thereof. Ribs 19a and 19c, Fig. 1, are provided on either side of section A (western half of the U. S.) and section C (portion of Canada). The rib members may be offset, as has been shown in Fig. 1 with reference to section D (Mexico and Central America), along the edges of which are ribs 19b and 19d.

Turned edge or flange 18 may extend the entire length or substantially the entire length of the rib 19, as shown by the left hand rib 19 of Fig. 2; or only portions of the rib may be turned to form tongues 18' shown in Fig. 2 with respect to the right hand rib 19'. Thus in Fig. 2, cover section A is supported along its left edge by flange 18 of rib 19 and along its right edge by tongue 18' which is turned to the left of rib 19'. The entire edge of the removable cover may be grooved, as has been the left edge 11 of section A (i. e., where a long rib flange 18, is provided) or (where short rib tongues 18' are provided) only portions of the section edge may be grooved, such as recess 11' on the right edge of section A. Rib 19' is further provided in Fig. 2 with tongues 18x, 18x which are turned rightward and which serve to support the left edge of cover section E.

A pair of ribs, such as 19—19 in Fig. 3 may separate plastic or molded (immovable) globe sections 6 which lie to either side of the removable cover section 10; or plastic globe structure 6 may form one boundary of a rib, such as rib 19, Fig. 2 and a removable section—such as E—may lie to the other side of cooperative rib 19'. In other words, a rib member, such as 19, Fig. 2, may have immobile plastic or molded globe structure 6 on one side and a removable section A on the other side; or it may have, such as rib 19', Fig. 2, removable sections A and E on either side. Where irregular shaped sections—such as B, Fig. 1, are used—the ribs 19 will follow the contour of the section. The rib members may be provided with punched out tabs 17, Fig. 3, which embed in the plaster or molded globe structure 6 to anchor the same and hold it more securely.

To the underside of the removable cover section 10 may be fastened as by a small piece or pieces of textile, paper or the like material 16, a paper or cloth map 15, one part of the sticker 16 being glued or otherwise fastened to the underside of globe section 10 and the other part, to the map 15. Preferably, and as shown in Fig. 4, the map 15 is fastened to the underside of cover section 10 by one or more stickers 16—two being used in Fig. 4— the stickers being fastened to the paper (or cloth) map 15 preferably near one corner thereof, as shown in the figure, to avoid interference with the unfolding and use of the map.

The map 15, in much greater scale and finer detail, is associated—in the form shown in Figs. 3 and 4, attached to the underside—with a globe section 10, the outer surface of which represents fully or in part, or is closely positioned relative to, that geographical section of the world to which the individual map relates. If it is desired to consult the individual map, which in the form shown in Figs. 3 and 4 is attached to the underside of cover section 10 and which is in folded condition, the globe section 10—of course accompanied by the individual paper map—is removed from the globe. This is readily accomplished by flexing the Celluloid section to withdraw its edge grooves 11 from the rib flange 18 (or tongues 18', Fig. 2). To facilitate the flexing and handling of the section cover, finger nail recesses 4 are provided along the edge of the molded globe portions 6 (see Figs. 3 and 2). Where removable sections lie to either side of a rib, such as sections A and E, Fig. 2, the edges of the sections may be provided with finger nail recesses 14 (see Fig. 2).

The individual maps will of course be of approriate size which need not be uniform. The back of the paper (or cloth) maps may be used to alphabetically list names of cities, etc., which may be readily spotted on the individual map by the usual system of two coordinating indicia. The maps (in folded condition, Fig. 3, or rolled, see Fig. 6) do not ordinarily extend to the center of the globe, see Fig. 5, although one, such as map 15Z may extend through the center without interfering with the other maps.

Instead of being folded—15, Figs. 3 and 4—the maps may be rolled; map 25, Fig. 6, and attached to the underside of the globe sections in the same manner as the folded map. The map, whether folded or rolled, instead of being permanently (preferably adhesively) attached to the underside of the globe section as in Figs. 3 and 4, may be removably associated therewith, as by means of a spring clip 13 attached to the underside of section 10, between the leaves of which the map (rolled or folded) is caught and held.

In Figs. 3 and 2, rib member 19 is provided with a projecting flange 18 or tongue 18' and the edge of the cover section 10 is provided with a groove 11 or recess 11', in which the said flange or tongue is received. These parts may be reversed as shown in Fig. 7 wherein the rib member 39 is provided with grooves 38 and the globe cover 30 is rabbeted (31) to form projecting runner 32 which fits in the rib groove 38. The rib and its groove also serve to anchor and support the solid molded parts 6 of the globe. Rib member 39 may be fabricated from a strip stock as shown in Fig. 10 wherein portions of the upper edge of the strip are turned to the left to form left upper flanges 37 and other portions of the strip are turned or tabbed out to the left to form left tab flanges 36. Between the upper and lower left flanges, respectively 37 and 36, is received the runner 32 of the left removable section 30. Other portions of the strip are turned to the right to form upper right flange 35 and lower right flange 34. Right flanges 34 and 35 likewise receive between them the runner of the cover section, in this case right section 30.

The cover plate 10 may have associated, permanently or removably, either a single map, such as in Figs. 3 and 4, or it may have two or more maps 15 associated with it as shown in Fig. 8. The rib construction (Figs. 2, 3 or Figs. 7, 10) may be employed for holding in place immobile parts of the sphere, namely, those areas of the globe which remain fixed in place and have not associated therewith individual maps; the immobile sphere surface would in this instance be constructed of a sheet material (and might in fact be made like removable section 10) rather than of a cast, molded, pressed or the like construction 6. The entire globe may be constructed of immobile plate sections and removable cover sections held in place by means of rib members.

Instead of associataing the individual maps, either permanently or replaceably, with the cover sections, the cover sections may serve merely to cover portions of the sphere and permitting access to compartments 46, see Fig. 9, formed in the globe 40. Within the compartments are contained (preferably one) individual maps which may be folded or rolled, such as map 25, Fig. 9.

As pointed out above, the individual paper maps and the removable globe sections may be replaced whenever desired by more up-to-date maps and sections, which may be issued from time to time and distributed as supplements. In this manner, the globe may be permanently and inexpensively kept up-to-date. Instead of, or in addition to, the individual maps, pictures either historical, geographical or otherwise, may be associated with the respective removable globe sections.

I claim:

1. In a device of the class described, in combination, a territorial globe bearing on its surface a world map representing geographical units and comprising immobile areas and removable globe sections related to the said geographical units, rib members in the form of strips some of which separate the said immobile globe areas and the said removable globe sections, the outward edges of the said rib members being turned to form flanges, and the said removable sections being formed of a flexible material, the edges of which are grooved to receive the said flanges of the rib members, and a plurality of individual maps each relating to a geographical unit and drawn to a larger scale and in greater detail than the said globe map, the said individual maps being contained within the globe in folded condition and associated with respective removable sections by being attached to the underside thereof by a flexible adhesive strip.

2. In a device of the class described, in combination, a territorial globe bearing on its surface a world map representing geographical units and comprising immobile areas and removable globe sections related to the said geographical units, rib members in the form of strips some of which separate the said immobile globe area and the said removable globe sections, portions of the outward edges of the said rib members being turned to form tongues, and the said removable sections being formed of a flexible material, the edges of which are grooved to form recesses to receive the said tongues of the rib members, and a plurality of individual maps each relating to a geographical unit and drawn to a larger scale and with greater detail than the said globe map, the said individual maps being contained within the globe in folded condition and associated with respective removable sections by being attached to the underside thereof.

3. In a device of the class described, in combination, a territorial globe bearing on its surface a world map representing geographical units and comprising immobile areas and removable globe sections related to the said geographical units, rib members in the form of strips some of which separate the said immobile globe areas and the said removable globe sections, the outward edges of the said rib members being turned to form projecting portions, and the said removable sections being formed of a flexible material, the edges of which are recessed to receive the said projecting portions of the rib members, and a plurality of individual maps each relating to a geographical unit and drawn to a larger scale and with greater detail than the said globe map, the said individual maps being contained within the globe and associated with respective removable sections.

4. In a device of the class described, in combination, a territorial globe bearing on its surface a world map representing geographical units and comprising immobile areas and removable globe sections related to the said geographical units, rib members in the form of strips some of which separate the said immobile globe areas and the said removable globe sections, the outward edges of the said rib members being turned to form projecting portions, and the said removable sections being formed of a flexible material, the edges of which are grooved to receive the said projecting portions of the rib members, and a plurality of individual maps each relating to a geographical unit and drawn to a larger scale and with greater detail than the said globe map, the said individual maps being contained within the globe, and the underside of the said removable sections being provided with means for replaceably holding respective ones of the said individual maps.

5. In a device of the class described, in combination, a territorial globe bearing on its surface a world map representing geographical units and longitude and latitude lines and comprising immobile areas and removable globe sections related to the said geographical units, rib members in the form of strips some of which separate the said immobile globe areas and the said removable globe sections, the said members serving to hold the said removable sections, the said removable sections being of rectilinear shape, the sides of which are parallel to the said longitude and latitude lines, and the said rib members being arranged parallel to the said lines, and a plurality of individual maps each relating to a geographical unit and drawn to a larger scale than the said globe map, the said individual maps being contained within the globe and associated with respective removable sections.

6. In a device of the class described, in combination, a territorial globe bearing on its surface a world map representing geographical units and comprising immobile areas and removable globe sections related to the said geographical units, rib members in the form of strips some of which separate the said immobile globe areas and the said removable globe sections, the said members serving to hold the said removabe sections, the said removable sections being shaped to the outline of the different geographical units and the said rib members being arranged to conform with the irregular shape of the removable sections, and a plurality of individual maps each relating to a geographical unit and drawn to a larger scale and in greater detail than the said globe map, the said individual maps being contained within the globe and associated with respective removable sections.

7. In a device of the class described, in combination, a territorial globe bearing on its surface a world map representing geographical units and comprising immobile areas and removable globe sections related to the said geographical units, rib members in the form of strips some of which separate the said immobile globe areas and the said removable globe sections, the said members being provided with grooves, and the said removable sections being formed of a flexible material, the edges of which are rabbeted to provide runners receivable in the said grooves of the rib members, and a plurality of individual maps each relating to a geographical unit and drawn to a larger scale and with greater detail than the said globe map, the said individual maps being contained within the globe and associated with respective removable sections.

8. In a device of the class described, in combination, a territorial globe bearing on its surface a world map representing geographical units and comprising immobile areas and removable globe sections related to the said geographical units, and a plurality of individual maps each relating to a geographical unit and drawn to a larger scale and in greater detail than the said globe map, the said individual maps being contained within the globe and associated with respective removable sections by being attached to the underside thereof by a flexible adhesive strip.

9. In a device of the class described, in combination, a territorial globe bearing on its surface a world map representing geographical units and comprising immobile areas and removable globe sections related to the said geographical units, and a plurality of individual maps each relating to a geographical unit and drawn to a larger scale and in greater detail than the said globe map, the said individual maps being contained within the globe and associated with respective removable sections.

10. In a device of the class described, in combination, a territorial globe bearing on its surface a world map representing geographical units and comprising immobile areas and removable globe sections related to the said geographical units, and a plurality of individual maps each relating to a geographical unit and drawn to a larger scale and in greater detail than the said globe map, the said individual maps being contained within the globe in rolled condition and the underside of the said removable sections being provided with means for replaceably holding respective ones of the said individual maps.

11. In a device of the class described, in combination, a territorial globe bearing on its surface a world map representing geographical units and comprising immobile areas and removable globe sections related to the said geographical units, and a plurality of individual maps each relating to a geographical unit and drawn to a larger scale and in greater detail than the said globe map, the said individual maps being contained within the globe and the underside of the said removable sections being provided with spring clips for replaceably holding respective ones of the said individual maps.

12. In a device of the class described, in combination, a territorial globe bearing on its surface a world map representing geographical units and longitude and latitude and comprising immobile areas and removable globe sections related to the said geographical units, the said removable sections being of rectilinear shape, the sides of which are parallel to the said longitude and latitude lines, and a plurality of individual maps each relating to a geographical unit and drawn to a larger scale and in greater detail than the said globe map, the said individual maps being contained within the globe and associated with respective removable sections.

13. In a device of the class described, in combination, a territorial globe bearing on its surface a world map representing geographical units and comprising immobile areas and removable globe sections related to the said geographical units, the said removable sections being shaped to the outline of the different geographical units, and a plurality of individual maps each relating to a geographical unit and drawn to a larger scale and in greater detail than the said globe map, the said individual maps being contained within the globe and associated with respective removable sections.

14. In a device of the class described, in combination, a territorial globe bearing on its surface a world map representing geographical units and comprising immobile areas and removable globe sections related to the said geographical units, and a plurality of individual maps each relating to a geographical unit and drawn to a larger scale and in greater detail than the said globe map, the said individual maps being contained within the globe, the said removable sections having associated therewith two or more individual maps.

15. In a device of the class described, in combination, a territorial globe bearing on its surface a world map representing geographical units and comprising immobile globe areas and removable globe sections related to the said geographical units, rib members in the form of strips, the outward edges of which are turned to form projecting portions, the said immobile globe areas and removable globe sections being formed of a flexible material, the edges of which are recessed to receive the said projecting portions of the rib members, a plurality of individual maps each relating to a geographical unit and drawn to a larger scale and with greater detail than the said globe map, the said individual maps being contained with the globe and associated with respective removable sections, there being finger nail recesses to facilitate the removing and replacing of the said globe sections.

16. In a device of the class described, in combination, a territorial globe bearing on its surface a world map representing geographical units, comprising immobile areas and removable globe sections, and provided with compartments, a plurality of individual maps each relating to a geographical unit and drawn to a larger scale and in greater detail than the said globe map, the said individual maps being contained in respective ones of the said compartments, the said removable globe sections serving to close the said map compartments.

17. In a device of the class described, in combination, a territorial globe bearing on its surface a world map representing geographical units and comprising immobile areas and removable globe sections related to the said geographical units, rib members in the form of strips, some of which separate the said immobile globe areas and the said removable globe sections, portions of the outward edges of the said rib members being turned to form upper tongues and other portions of the said members being turned in the same direction to form lower tongues, and the said removable sections being formed of a flexible material, the edges of which are rabbeted to present runners receivable between the said upper and lower flanges of the rib members, and a plurality of individual maps each relating to a geographical unit and drawn to a larger scale and with greater detail than the said globe map, the said individual maps being contained within the globe and associated with respective removable sections.

18. In a device of the class described, in combination, a territorial globe bearing on its surface a world map representing geohaphical units and comprising immobile areas and removable globe sections related to the said geographical units, the said removable section being formed of a flexible material, the edges of which are rabbeted to present runners, rib members in the form of strips some of which separate the said immobile globe areas and the said removable globe sections, portions of the outward edges of the said rib members being turned to the left to form upper tongues and other portions of the said members being turned in the same directions to form lower tongues, the right edge runners of removable sections positioned to the left of a rib member being received between the said pair of leftwardly turned tongues, other portions of the said rib members being turned to the right to form similar pairs of tongues, the left edge runners of removable sections positioned to the right of a rib member being received between the said pair of rightwardly turned tongues, and a plurality of individual maps each relating to a geographical unit and drawn to a larger scale and with greater detail than the said globe map, the said individual maps being contained within the globe and associated with respective removable sections.

19. In a device of the class described, in combination, a territorial globe bearing on its surface a world map representing geographical units and comprising immobile areas and removable globe sections related to the said geographical units, and a plurality of geographical or historical pictures or the like relating to the respective geographical units and contained within the globe and associated with respective removable sections.

20. As a new article of manufacture used in conjunction with a territorial globe bearing on its surface a world map representing geographical units, a removable globe section having associated therewith an individual map relating to the geographical unit represented on the section and drawn to a larger scale and in greater detail than the said globe map.

21. In a device of the class described, in combination, a territorial globe bearing on its surface a world map representing geographical units and comprising immobile areas and removable globe sections related to the said geographical units, rib members in the form of strips some of which separate the said immobile globe areas and the said removable globe sections, portions of the outward edges of the said rib members being turned to form tongues, and the said removable sections being formed of a flexible material, the edges of which are grooved to form recesses to receive the said tongues of the rib members.

22. In a device of the class described, in combination, a territorial globe bearing on its surface a world map representing geographical units and longitude and latitude lines and comprising immobile areas and removable globe sections related to the said geographical units and longitude and latitude lines and comprising immobile areas and removable globe sections related to the said geographical units, rib members in the form of strips some of which separate the said immobile globe areas and the said removable globe sections, the said members serving to hold the said removable sections, the said removable sections being of rectilinear shape, the sides of which are parallel to the said longitude and latitude lines, and the said rib members being arranged parallel to the said lines.

23. In a device of the class described, in combination, a territorial globe bearing on its surface a world map representing geographical units and comprising immobile areas and removable globe sections related to the said geographical units, rib members in the form of strips some of which separate the said immobile globe areas and the said removable globe sections, the said members being provided with grooves, and the said removable sections being formed of a flexible material, the edges of which are rabbeted to provide runners receivable in the said grooves of the rib members.

24. In a device of the class described, in combination, a territorial globe bearing on its surface a world map representing geographical units and comprising immobile globe areas and removable globe sections related to the said geographical units, rib members in the form of strips, the outward edges of which are turned to form projecting portions, the said immobile globe areas and removable globe sections being formed of a flexible material, the edges of which are recessed to receive the said projecting portions of the rib members, there being finger nail recesses to facilitate the removing and replacing of the said globe sections.

25. In a device of the class described, in combination, a territorial globe bearing on its surface a world map representing geographical units and comprising immobile areas and removable globe sections related to the said geographical units, rib members in the form of strips, some of which separate the said immobile globe areas and the said removable globe sections, portions of the outward edges of the said rib members being turned to form upper tongues and other portions of the said members being turned in the same direction to form lower tongues, and the said removable sections being formed of a flexible material, the edges of which are rabbeted to present runners receivable between the said upper and lower flanges of the rib members.

26. In a device of the class described, in combination, a territorial globe bearing on its surface a world map representing geographical units and comprising immobile areas and removable globe sections related to the said geographical units, the said removable section being formed of a flexible material, the edges of which are rabbeted to present runners, rib members in the form of strips some of which separate the said immobile globe areas and the said removable globe sections, portions of the outward edges of the said rib members being turned to the left to form upper tongues and other portions of the said members being turned in the same directions to form lower tongues, the right edge runners of removable sections positioned to the left of a rib member being received between the said pair of leftwardly turned tongues, other portions of the said rib members being turned to the right to form similar pairs of tongues, the left edge runners of removable sections positioned to the right of a rib member being received between the said pair of rightwardly turned tongues.

LEON H. AMDUR.